Sept. 23, 1947.  A. G. FORSYTH  2,427,846
POWER UNIT
Filed July 13, 1944  5 Sheets-Sheet 3

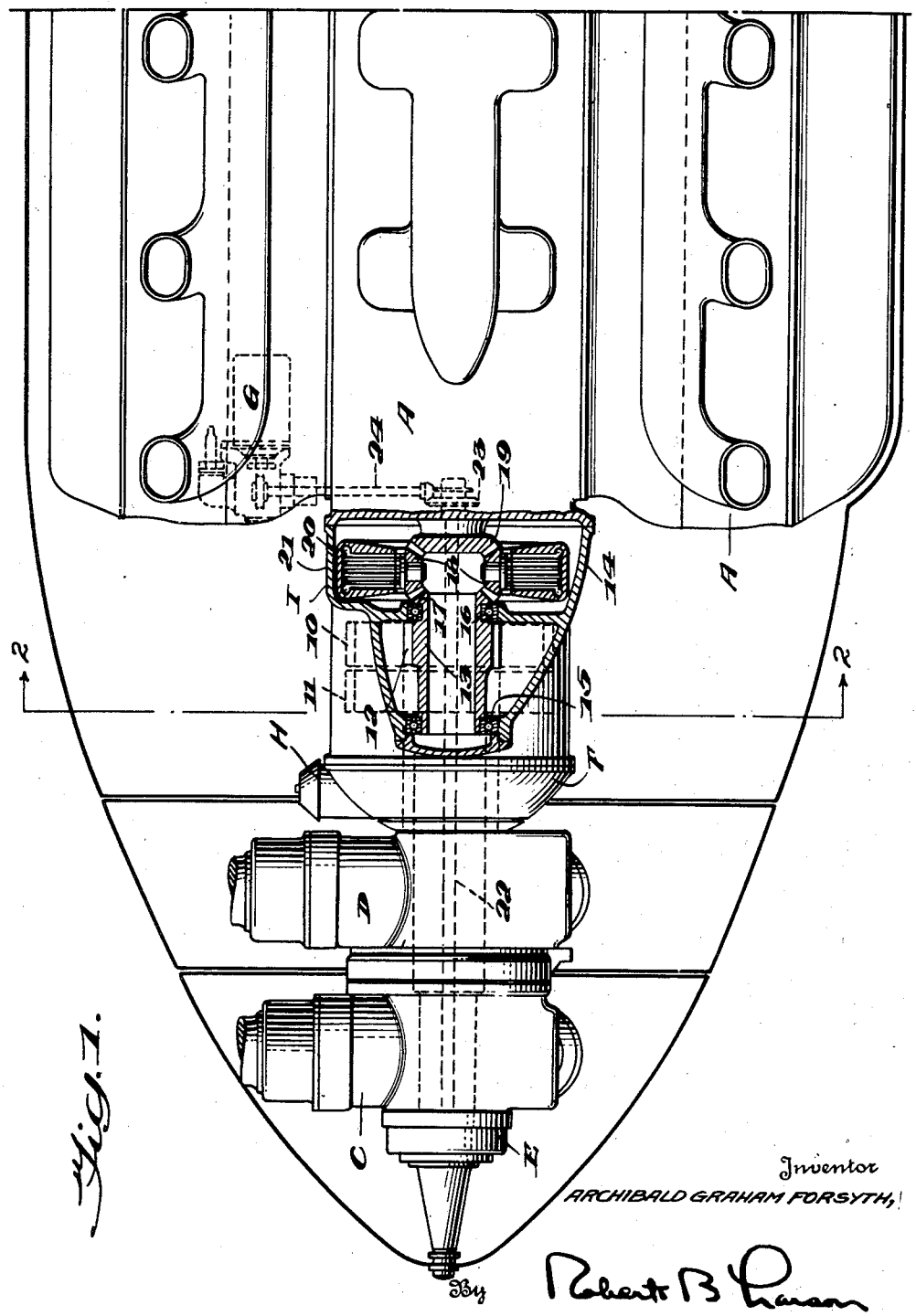

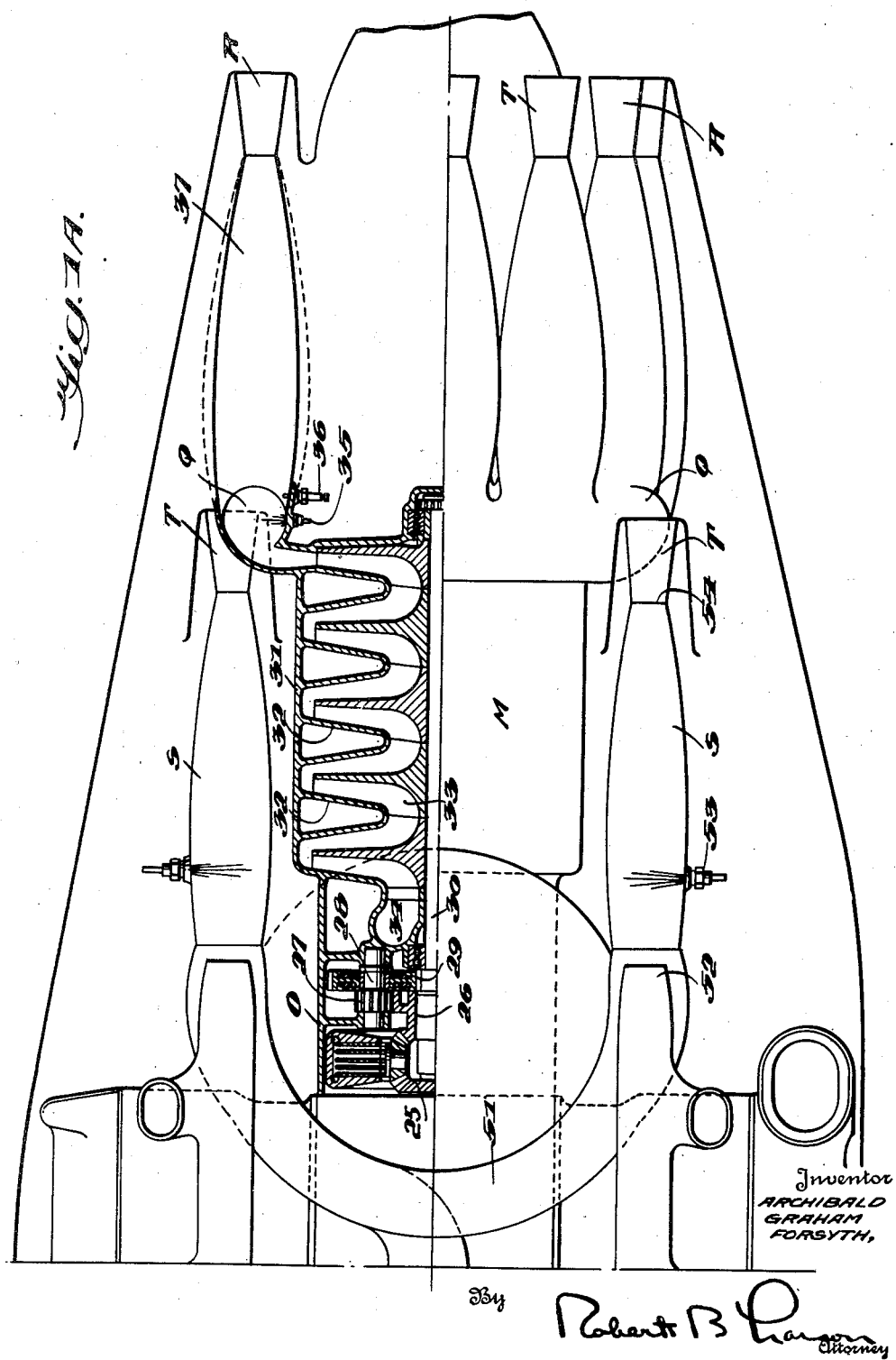

Inventor
ARCHIBALD GRAHAM FORSYTH,
By Robert B. Larson
Attorney

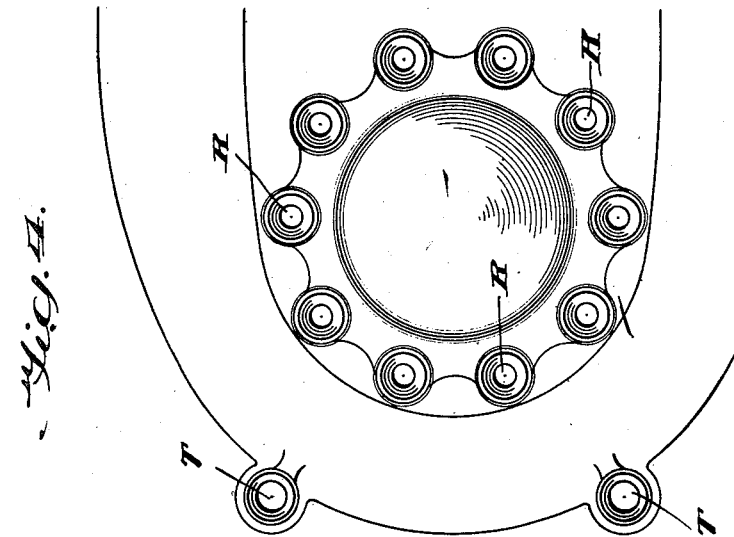
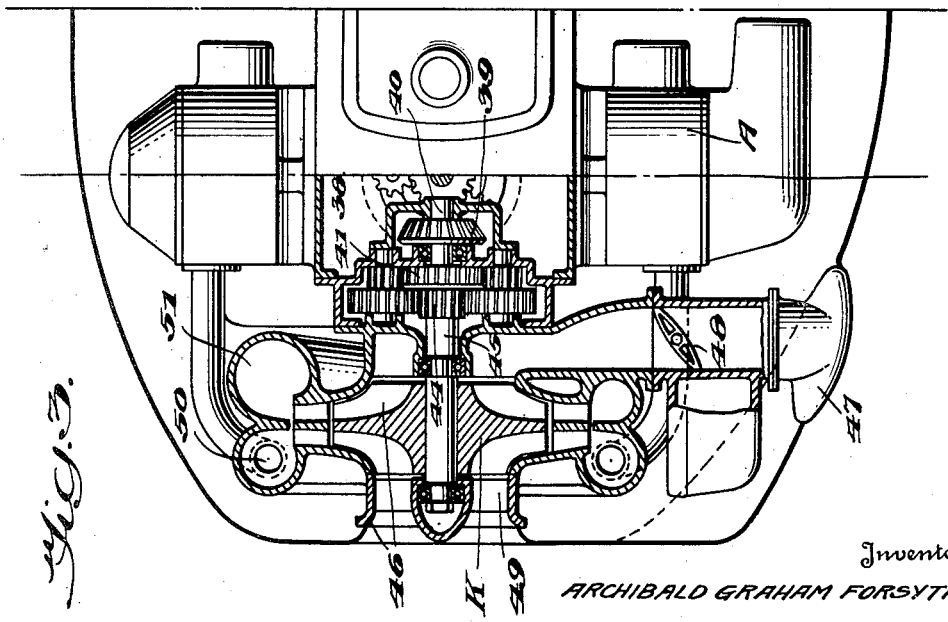

Sept. 23, 1947. A. G. FORSYTH 2,427,846
POWER UNIT
Filed July 13, 1944 5 Sheets-Sheet 5
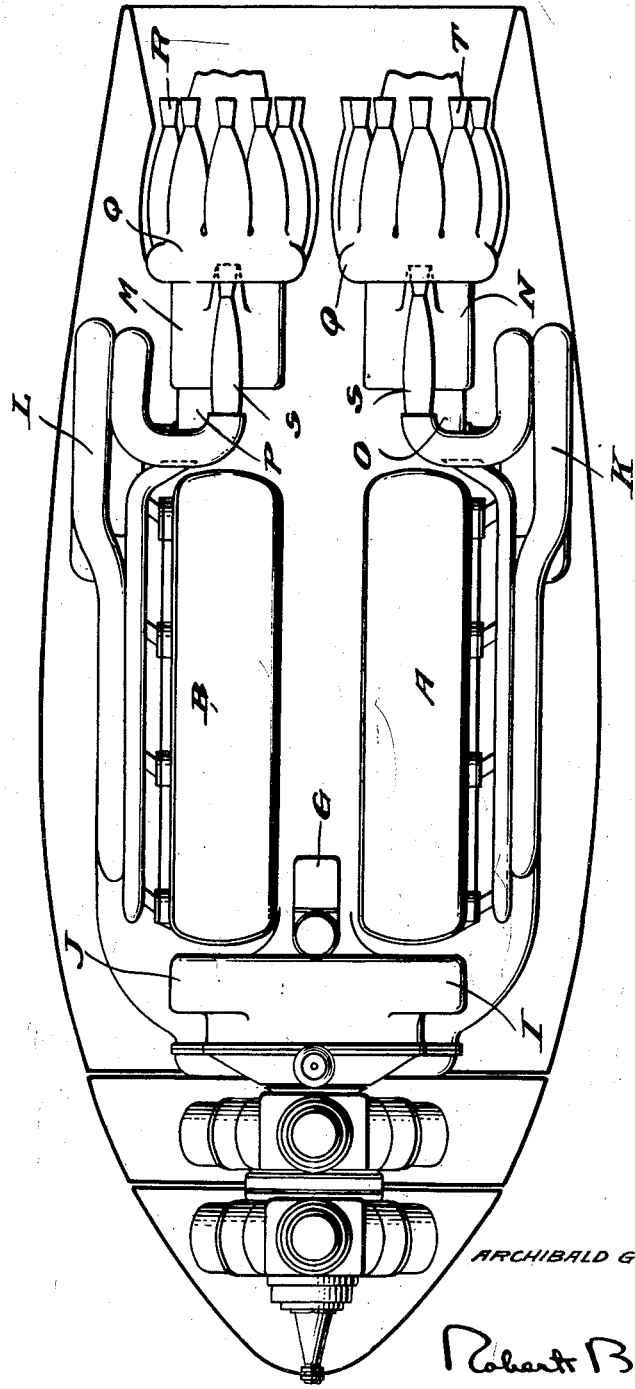
Inventor
ARCHIBALD GRAHAM FORSYTH,
Robert B. Graham
Attorney Patented Sept. 23, 1947

2,427,846

UNITED STATES PATENT OFFICE 2,427,846

POWER UNIT

Archibald Graham Forsyth, Cheam, England, assignor to The Fairey Aviation Company Limited, Hayes, England Application July 13, 1944, Serial No. 544,790

5 Claims. (Cl. 170—135.6)

This invention relates to power units particularly for aircraft and the like.

The invention comprises a combination of various mechanisms so connected as to give rise to a variety of operating conditions.

Generally, the invention is directed to a unit comprising a pair of internal combustion engines adapted to be clutched to drive a pair of variable pitch propellers mounted on coaxial drive shafts. The engines are supercharged and at the rear may be clutched respectively to compressors which supply air under pressure to combustion chambers of jet propulsion devices. Each supercharger is adapted to supply air under pressure to its engine and also to direct air to combustion chambers of a series of auxiliary jet propulsion devices, supplied also with exhaust gases from the engine. It is a general object of the invention to provide such a unit.

Other objects of the invention will become more apparent from the following description and claims when read on the accompanying drawings in which:

Figs. 1 and 1a together comprise a side elevation of a unit constructed in accordance with the invention, certain mechanisms being shown in section;

Fig. 2 is an irregular cross-sectional view on the line 2—2 of Fig. 1 on a slightly enlarged scale looking in the direction of the arrows with portions of the housing and gears 10, 11 and 12 removed to show clutching devices I and J;

Fig. 3 is a sectional view taken through one of the superchargers;

Fig. 4 is a rear end view of the unit (only one-half showing); and

Fig. 5 is a top plan view of the structure shown in Figs. 1 and 1a.

Figure 2:
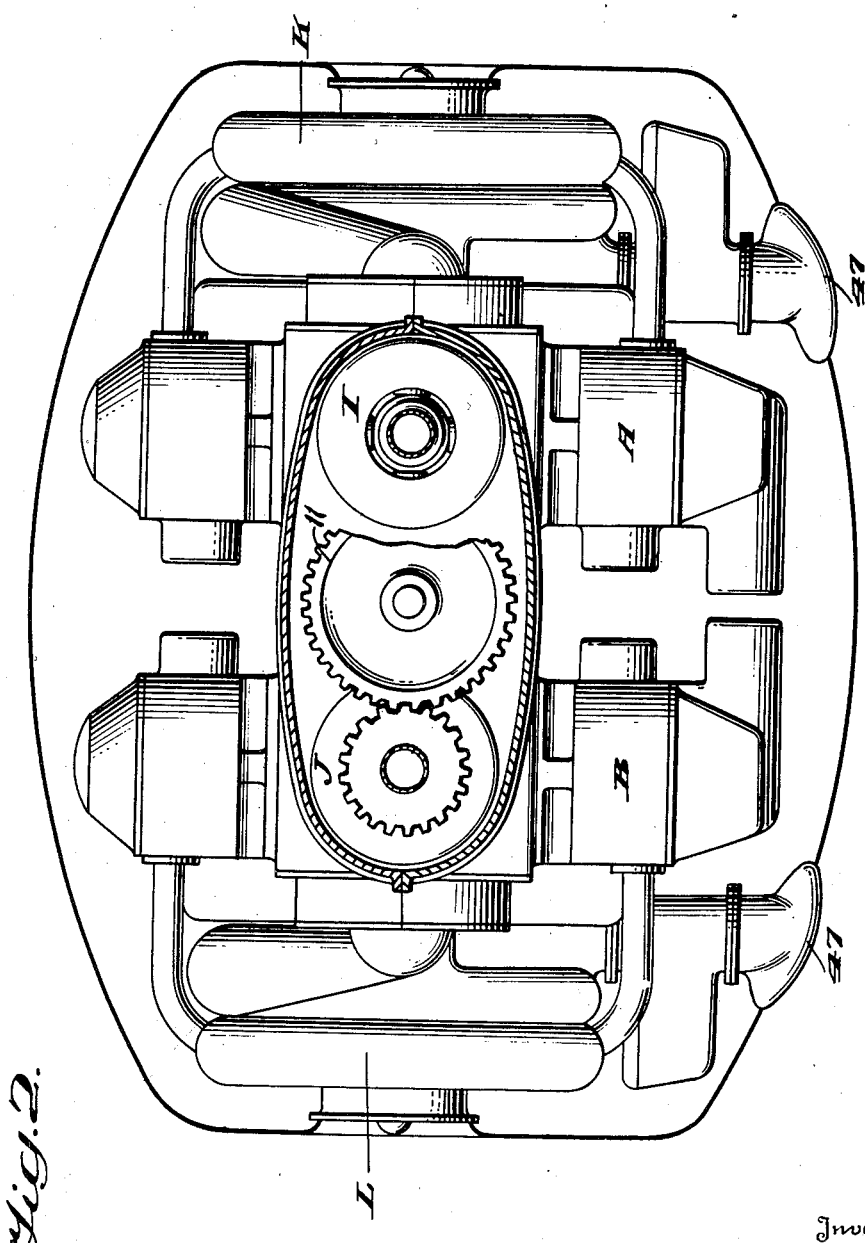

The unit is comprised of two internal combustion engines A and B which are adapted to drive two propellers C and D in contra-rotating directions. The propellers C and D are variable pitch propellers. The pitch may be varied by the pitch changing mechanisms E and F which are actuated respectively by electric motors G and H, or the like. The specific form of pitch changing mechanism per se forms no part of this invention, but it may, for example, be of the type illustrated and described in my copending application Serial No. 472,882, filed January 19, 1943.

The unit is provided with a pair of clutching devices I and J, one for each of the engines A and B, respectively, so that either or both of the propellers C and D may be declutched from the engines.

Each engine is provided with a supercharger, engine A with the supercharger K and engine B with supercharger L. These superchargers are mounted on the sides of the engines at the rear and are driven from the engine crankshafts as shown in Fig. 3 and as will be hereinafter described.

To the rear of engines A and B are two compressors M and N which are adapted to be driven respectively by the engines when desired. Each is connected to its driving engine through a clutching device O and P.

The compressors M and N are each adapted to supply gases under pressure to a series of cigar-shaped jet propulsion combustion chambers Q. The chambers Q extend rearwardly and terminate in propulsion jets R.

The superchargers K and L are adapted to supply air under pressure to the intake manifolds of the engines A and B and also to a series of cigar-shaped jet propulsion combustion chambers S which are also fed with exhaust gases from the engines. The chambers S terminate in propulsion jets T.

The arrangement of the propulsion jets R and T is perhaps best shown in Fig. 4.

Having described generally the elements comprising the unit, some of the specific structure will now be specifically described.

The propellers C and D are mounted on coaxial drive shafts, one of which is connected with a gear wheel 10 and the other with a gear wheel 11. The gear wheel 10 engages teeth 12 on a shaft 13 of the clutching device I, while the other gear wheel 11 engages teeth on a similar shaft of the other clutching device J (not shown). Since the clutching devices I and J are similar, a description of device I will suffice.

The shaft 13 of clutching device I is mounted for rotation in the housing 14 of the device I by means of bearings 15 and 16. The engine end of shaft 13 is formed as a bevel gear 17 which engages bevel gears 18. These bevel gears 18 in turn are engaged by a bevel gear 19 driven by the engine A. The clutching device I is provided with a plurality of annular discs 20 and 21 alternately disposed and which may (by means not shown) be caused to engage each other frictionally.

The shafts of bevel gears 18 are connected with one set of the discs, so that when the discs frictionally engage, the bevel gears 18 may not rotate about their axes. When this is the case the bevel gear 19 will drive the shaft 13 and then through teeth 12, the gear wheel 10 thus rotating the propeller C.

By similar mechanism, propeller D may be driven or declutched by the other engine B through clutching device J and gear wheel 11. Clutching devices of the general type of I and J are well known per se.

The pitch of propeller A may be varied by the pitch changing mechanism E which is operatively connected with the shaft 22, the engine end of which is provided with a bevel gear 23. This gear 23 is connected to be driven by a shaft 24 connected to the reversible electric motor G. Operation of the motor G may thus effect a change in the pitch of the blades of propeller C.

The pitch of the blades of propeller D may be changed through pitch changing mechanism F which is actuated by the reversible electric motor H.

At the rear of engine A (Fig. 1a), the crankshaft is provided with a bevel gear 25 of the clutching device O which is of the same type as clutching devices I and J. Through this clutch device O bevel gear 25 may be clutched or declutched from a shaft 26.

Shaft 26 is engaged by pinions 27 mounted on shafts 28 and these shafts 28 have gear wheels 29 secured thereto. The gear wheels 29 in turn engage teeth on the rotor shaft 30 of the compressor M.

The compressor M has a cylindrical tubular housing 31, the inner surface of which is provided with a series of inwardly directed projections 32 of V section. The rotor shaft 30 carries a series of compressor blades 33. The compressor is supplied with air through the chamber 34 at the front of the compressor and the compressor delivers the compressed air at the rear into the series of jet propulsion combustion chambers Q.

The combustion chambers Q are each supplied with fuel through nozzles 35. A sparking plug 36 or the like is provided for use particularly in starting and until the combustion chambers become hot.

The rear ends of combustion chambers Q are formed as a venturi 37 and terminate in the propulsion jets R. These direct the exhaust gases rearwardly.

Through an identical arrangement, engine B, through a clutching device P (not shown), may drive a similar compressor N which supplies jet propulsion combustion chambers connected therewith.

With reference to Fig. 3, the supercharger K of engine A will be described, it being understood that supercharger L for engine B is similarly actuated.

The crankshaft of engine A has a bevel gear 38 which engages bevel gear 39 on a stub shaft 40. Shaft 40 is provided with a gear wheel 41 which forms part of a step-up gear train including gears 42 and 43, the latter engaging gear teeth 44 on the rotor shaft 45 of the supercharger.

The supercharger is of known type having blades 46 carried by rotor shaft 45 and disposed to rotate in a housing. Air is introduced through an inlet tube 47 controlled by a valve 48 or the like. Air may also be drawn in from the side through the opening 49.

The supercharger has convolute outlet passages 50 and 51. The passage 50 directs supercharged air to the intake end of the engine A while the passage 51 (see also Fig. 1a) directs compressed air to the auxiliary jet propulsion combustion chambers S. The engine A also has exhaust outlets 52 (Fig. 1a) which are disposed to direct the exhaust gases to said combustion chambers S, so that said chambers receive both said exhaust gases from the engine and also compressed air from the supercharger. The combustion chambers S are provided with fuel nozzles 53 to supply fuel from a source (not shown).

The combustion chambers S are generally similar to combustion chambers Q. They are formed at their rear ends as a venturi 54 and terminate in rearwardly directed propulsion jets T. The arrangement of the jets T with respect to the jets R is shown in the rear view Fig. 4.

The general operation of the various mechanisms is believed to be clear but the manner of operation of the complete unit for various flight conditions perhaps requires some elucidation.

On take-off, both engines A and B will be operated to drive their respective propellers C and D. The clutching devices I and J will then be in clutching position. Preferably, on take-off, the clutching devices O and P at the rear will be declutched so that the compressors M and N will not be driven.

During cruising at lower altitudes, one or both of the propellers C and D may be actuated, and if desired, one or both of the compressors M and N may be driven to supply the combustion chambers Q of the jet units, so that jet propulsion through jets R may be provided. Or, alternatively, the propulsive force may be supplied only by these jets R, with the clutching devices I and J at the front declutched so as to disconnect the propellers. The propellers may be feathered to reduce the resistance effect thereof.

At high altitudes the engine is supercharged and the propellers may be cut out. The craft may then be driven solely by jet propulsion through jets R and also by the jets T. As explained, jets T are supplied from combustion chambers S which receive exhaust gases from the engine and also air from the supercharger.

Since there are two engines A and B, two compressors M and N, each of which is clutched to an engine and is connected with a series of propulsion jets R, and also since there are two superchargers (one for each engine), each connected with a series of propulsion jets T, and further, since the engines may be clutched or declutched to drive a propeller, it will be manifest that a great number of operative conditions may be effected.

It should be clear that changes in the structure and arrangement of the various mechanisms shown may be made without departing from the invention as defined in the following claims.

What I claim is:

1. A propulsion unit for aircraft and the like comprising, a pair of supercharged internal combustion engines, a pair of variable pitch propellers, means for selectively clutching each of said engines to drive said propellers, means for independently varying the pitch of the blades of either propeller, a pair of compressors, means for selectively clutching each engine to a compressor, two series of jet propulsion devices each respectively being supplied with compressed air from one of said compressors, a plurality of auxiliary jet propulsion devices, and means for supplying the combustion chambers of the latter with supercharged air from the engine superchargers and also with exhaust gases from the engines.

2. A propulsion unit for aircraft and the like comprising, a pair of internal combustion engines, a pair of variable pitch propellers having coaxial drive shafts, means for driving said propellers by said engines in contra-rotating directions, means for selectively clutching each of said engines to drive said propellers in contrarotating directions, means for independently varying the pitch of the blades of said propellers, a pair of compressors, each mounted respectively rearwardly of an engine, means for selectively clutching each engine to the compressor mounted rearwardly thereof to drive the same, a series of jet propulsion devices connected with each compressor to receive compressed gases therefrom, said jet propulsion devices terminating rearwardly of said compressors and disposed with their axis substantially in a circle, a pair of superchargers, one for each engine and driven thereby, each supercharger being mounted at the side and at the rear of its engine, a series of auxiliary jet propulsion devices disposed rearwardly of said first jet propulsion devices, and means for supplying compressed air from said superchargers to said auxiliary jet propulsion devices.

3. A propulsion unit for aircraft and the like comprising, a pair of internal combustion engines, a pair of variable pitch propellers having coaxial drive shafts, means for driving said propellers by said engines in contra-rotating directions, means for selectively clutching each of said engines to drive said propellers in contrarotating directions, means for independently varying the pitch of the blades of said propellers, a pair of compressors, each mounted respectively rearwardly of an engine, means for selectively clutching each engine to the compressor mounted rearwardly thereof to drive the same, a series of jet propulsion devices connected with each compressor to receive compressed gases therefrom, said jet propulsion devices terminating rearwardly of said compressors and disposed with their axis substantially in a circle, a pair of superchargers, one for each engine and driven thereby, each supercharger being mounted at the side and at the rear of its engine, a series of auxiliary jet propulsion devices disposed rearwardly of said first jet propulsion devices, means for supplying compressed air from said superchargers to said auxiliary jet propulsion devices, and means for supplying said auxiliary jet propulsion devices with exhaust gases from said engines.

4. A propulsion unit for aircraft and the like comprising at least one internal combustion engine, a variable pitch propeller, means for selectively clutching said engine to drive said propeller, means for varying the pitch of said propeller, a compressor mounted rearwardly of said engine, means for selectively clutching the compressor to be driven by said engine, at least one jet propulsion device mounted to receive compressed gases from said compressor, said jet propulsion device projecting rearwardly, at least one auxiliary jet proplusion device disposed rearwardly of the first, a supercharger disposed at the rear side of said engine and connected to be driven thereby, and means for directing at least a portion of the supercharged air to said auxiliary jet propulsion device.

5. A propulsion unit for aircraft and the like comprising at least one internal combustion engine, a variable pitch propeller, means for selectively clutching said engine to drive said propeller, means for varying the pitch of said propeller, a compressor mounted rearwardly of said engine, means for selectively clutching the compressor to be driven by said engine, at least one jet propulsion device mounted to receive compressed gases from said compressor, said jet propulsion device projecting rearwardly, at least one auxiliary jet propulsion device disposed rearwardly of the first, a supercharger disposed at the rear side of said engine and connected to be driven thereby, means for directing at least a portion of the supercharged air to said auxiliary jet propulsion device, and means for directing exhaust gases from said engine to said auxiliary jet propulsion device.

ARCHIBALD GRAHAM FORSYTH.

REFERENCES CITED

The following references are of record in the file of this patent:

UNITED STATES PATENTS

| Number | Name | Date |
|---|---|---|
| 1,770,937 | Martin | July 22, 1930 |
| 2,160,281 | Price | May 30, 1939 |
| 2,233,031 | Price | Feb. 25, 1941 |
| 2,356,557 | Anxionnaz et al. | Aug. 22, 1944 |
| 2,390,161 | Mercier | Dec. 4, 1945 |

FOREIGN PATENTS

| Number | Country | Date |
|---|---|---|
| 513,751 | Great Britain | Oct. 20, 1939 |
| 538,022 | Great Britain | July 17, 1941 |
| 495,469 | Great Britain | Feb. 8, 1937 |
| 818,703 | France | June 21, 1937 |

OTHER REFERENCES

Ser. No. 396,458, Richard (A. P. C.), published May 25, 1943.